ESAKI DIODE PCM REGENERATOR

Filed July 31, 1961 2 Sheets-Sheet 1

INVENTOR.
S. E. MILLER
BY
Sylvan Sherman
ATTORNEY

ESAKI DIODE PCM REGENERATOR

Filed July 31, 1961 2 Sheets-Sheet 2

INVENTOR.
S. E. MILLER
BY
Sylvan Sherman
ATTORNEY 3,182,203
Patented May 4, 1965

3,182,203

ESAKI DIODE PCM REGENERATOR

Stewart E. Miller, Middletown, N.J., assignor to Bell Telephone Laboratories, Incorporated, New York, N.Y., a corporation of New York Filed July 31, 1961, Ser. No. 128,035
13 Claims. (Cl. 307—88.5)

This invention relates to apparatus for modifying the amplitude range of electromagnetic waves and, more specifically, to apparatus for regenerating and reshaping short duration pulses.

A major problem in the design of long distance communications systems relates to the reduction of noise and distortion that are introduced along a transmission path and by associated equipment. One particular system which has been developed to obviate this impairment of the signal is the so-called "pulse code modulation" or "PCM" system of transmission. An advantage of a transmission system employing pulse code modulation resides in the ability to completely regenerate the pulses representing the message at intervals along the transmission path and thereby to prevent the accumulation of distortion due to noise, bandwidth limitations and other effects detrimental to the signal quality.

Typically, in a PCM system the information is transmitted in the form of a code in which each of the code elements exists in either of two states. One state consists of a space, that is, a time slot in which no signal energy is present. The other state consists of a pulse which is a time slot occupied by microwave energy of a given amplitude. Thus, a series of binary digits is represented by a pulse train in which each digit is either a burst of high frequency wave energy or a void.

In a PCM repeater, the received wave, which consists of the signal pulse train upon which is superimposed spurious noise energy, is continuously sampled to determine whether or not a signal pulse is present at each time slot. This the repeater does by observing a particular characteristic of the input wave, usually the amplitude. The regenerator in the repeater is set to a predetermined level, called the slicing level, and responds to the input wave in one of two ways. If the amplitude of input wave is below the slicing level, as would be the case if the time slot were void or occupied by nothing but noise energy, the regenerator decides that no signal pulse is present, and provides no pulse at its output. If, on the other hand, the amplitude of the input wave is above the slicing level the regenerator decides that the time slot is occupied by a signal pulse and in response to this decision generates a new pulse which appears at its output. The amplitude of the new regenerated pulses is substantially constant, however, even though the signal pulses of the input wave may be either only slightly above or considerably above the slicing level.

Pulse regenerators for repeater stations have taken many forms, ranging from vacuum tube and transistor circuits including those of the multivibrator variety to distributed parameter networks employing nonlinear elements. The latter class of device is generally preferred for its electrical and structural simplicity and for its ability to operate in the upper microwave regions.

In the past, PCM regenerators of the distributed parameter type have comprised microwave hybrid networks such as the so-called "magic T" in combination with two or more semiconductor diodes. One such device, typical of the last-mentioned regenerator, is described in U.S. Patent 2,914,249, issued to W. M. Goodall on November 24, 1959. In order to achieve pulse regeneration in such a device it is necessary to bias the two diodes in a special manner so that one functions as an "expander" or "clipper" and the other as a "limiter." The level of the regenerated pulses is determined primarily by the relative bias between the two diodes; consequently, the diode biasing is extremely critical.

It is an object of the present invention to reshape and retime PCM signals.

It is a further object of the invention to provide microwave frequency circuits capable of providing nonlinear transmission characteristics and suitable for use as pulse regenerator circuits.

It is a more specific object of the present invention to provide a PCM regenerator of the distributed parameter type which requires no relative biasing voltage between the nonlinear elements.

In general, the above objects are accomplished in accordance with the principles of the present invention by terminating a high frequency transmission line, to which the input wave is applied, with a nonlinear impedance element of appropriate electrical characteristics. The electrical characteristics of this element are such that it is matched to the characteristic impedance of the transmission line when the amplitude of the wave energy incident upon it is below a first level, mismatched when the amplitude is above this level and below a second level, and again matched when the amplitude is above the second level.

A nonlinear element such as this is characterized by a dynamic impedance that is substantially constant over most of its operating range but is greatly different in an intermediate region of said range. The term "dynamic impedance" as used herein is understood to refer to the impedance presented by the element to a sinusoidal voltage of small amplitude. One element exhibiting such an electrical characteristic is the so-called Esaki (tunnel) diode, first described by Leo Esaki in an article entitled "New Phenomenon in Narrow Germanium p-n Junctions," published January 15, 1958, in vol. 109 of the Physical Review at page 603.

A transmission line terminated with a load having the electrical characteristics described above exhibits a reflection coefficient which varies from a minimum value to a maximum and back again to a minimum value with an increasing level of input wave energy. In particular, it has been found that if the characteristic impedance of the transmission line is matched to the dynamic impedance of the nonlinear impedance element for very low input levels the minimum reflection coefficients referred to above are substantially zero.

It should be noted that in the various circuits to be described in greater detail hereinafter, pulse regeneration is achieved by virtue of the intrinsic characteristics of certain nonlinear circuit elements, rather than as a result of the particular adjustment of one or more parameters of the circuit. In the prior art class of devices the operation of the circuit as a pulse regenerator is directly a function of these specially adjusted parameters and as a result the circuit is quite sensitive to small variations therein.

The above-mentioned and other features and objects of this invention will become more apparent by reference to the following description taken in conjunction with the accompanying drawings, in which.

Figure 1:
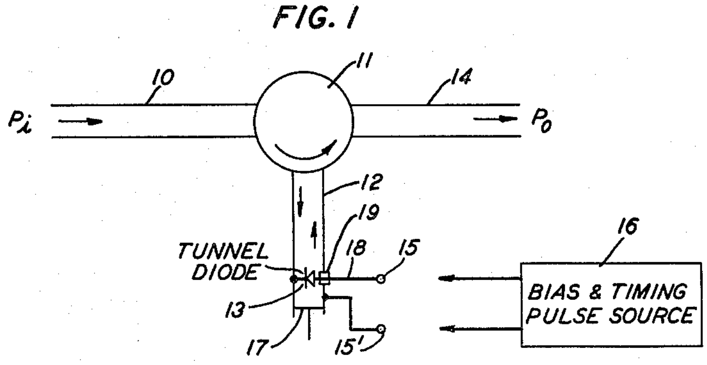
FIG. 1 is a schematic diagram of one embodiment of the present invention.

Referring more specifically to FIG. 1, there is shown a first embodiment of a pulse regenerator in accordance with the principles of the present invention. This embodiment comprises a 3-port circulator 11 to which there is connected an input waveguide section 10 and an output waveguide section 14. The third port of circulator 11 is connected to waveguide section 12 which is terminated with a nonlinear impedance element 13 which, in the illustrative embodiment, is a diode having a voltage-current characteristic to be described in more detail hereinbelow. A movable piston 17 is provided in waveguide section 12 for matching purposes.

Although depicted as hollow pipe waveguides, it is understood that this is for purposes of illustration only and that sections 10, 12, and 14 can, more generally, be any of the well known transmission media suitable for the particular frequency range of operation. Thus, sections 10, 12, and 14 can, alternatively, be coaxial or parallel wire transmission line. Likewise, circulator 11 can be of the type described in U.S. Patent 2,748,352, granted to applicant on May 29, 1956, or any of the other similar nonreciprocal devices known in the art.

Diode 13 is mounted in waveguide section 12 and oriented so that in the presence of input wave energy an electric potential appears across its electrodes. A lead 18 connected to one of the electrodes of diode 13 is brought out by way of an insulating bushing 19 through the waveguide wall and connected to terminal 15. Bushing 19 conductively insulates lead 18 and also acts as a radio frequency bypass for microwave energy, thus confining high frequency wave energy within guide 12. Terminal 15' is conductively connected to waveguide section 12 as is the other electrode of diode 13. In this manner diode 13 effectively terminates waveguide section 12 for microwave frequencies but is connected between terminals 15 and 15' for direct current and baseband frequencies.

A biasing and timing pulse source 16 is shown and will be discussed hereinafter; however, for the purposes of the present description it is assumed that source 16 is not connected to terminals 15–15' and that no direct current biasing voltage appears across diode 13.

In operation, input wave energy $P_i$ comprising a pulse code modulated signal upon which there is superimposed spurious noise energy is applied to circulator 11 through input waveguide section 10. The input wave is, in turn, applied to waveguide section 12. In keeping with the principles of the present invention, diode 13 is matched to the characteristic impedance $Z_0$ of waveguide section 12 for an input wave of very small amplitude. Aside from piston 17, the details of the matching means are not shown in FIG. 1; however, such matching may be accomplished by varying the dimensions of waveguide section 10 in the vicinity of diode 13 or by other suitable matching means known in the art.

Figure 2A:
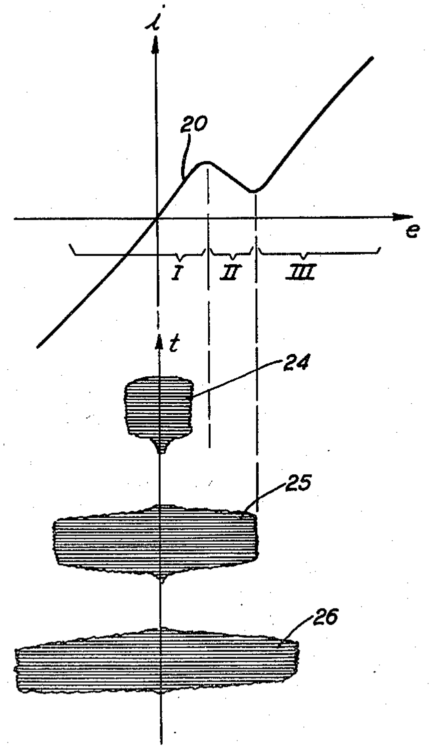
FIG. 2A is a graphic representation of a typical Esaki diode *e-i* curve showing the three separate impedance regions.

The operation of the embodiment of FIG. 1 may now be further explained with reference to FIGS. 2A and 2B. FIG. 2A is a graphic representation of the *e-i* curve of diode 13. Curve 20 shows the current-voltage characteristic of the diode and is divided into three regions:

Region I is designated the lower linear region for it is seen that this region is one of almost constant dynamic impedance. Region II is the region of negative impedance, and region III is the upper linear region. Regions I and III are quite similar in that the dynamic impedance is practically constant and substantially equal for both. As previously indicated, any element that displays an electrical characteristic such that region II has an impedance greatly different than regions I and III can be utilized. It is not necessary, although advantageous, that region II be one of negative impedance. Since the reflection coefficient of a transmission line terminated by an impedance $Z_l$ is given by $(Z_l-Z_0)/(Z_l+Z_0)$, it is seen that if $Z_l$ is negative, the magnitude of the reflection coefficient is always greater than unity, whereas with a positive load impedance $Z_l$ the magnitude of the reflection coefficient is always less than unity. The significance of this fact is that lower circuit losses occur in the device if region II is one of negative impedance than if it is one of positive impedance.

Figure 2B:
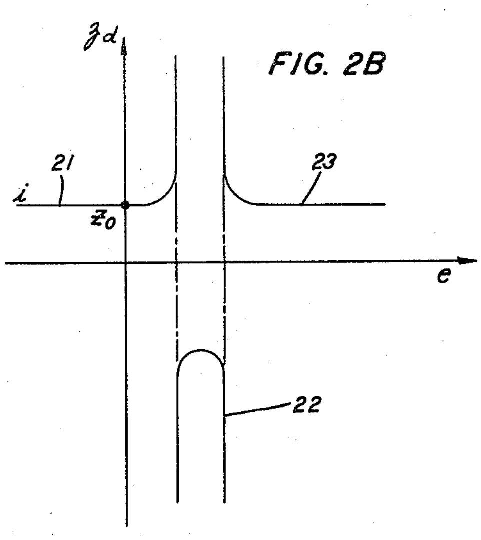
FIG. 2B is a graphic representation of the dynamic impedance of a typical Esaki diode as a function of voltage.

The curve of FIG. 2B is a plot of the dynamic impedance $z_d$ of diode 13 on the same voltage scale as that of FIG. 2A. The portions 21, 22, and 23 of the curve correspond to regions I, II, and III of curve 20, respectively. In keeping with the principles of the invention the regions of constant dynamic impedance are shown to be effectively equal to the characteristic impedance $Z_0$ of the transmission line, which is the preferred match.

Referring again to FIG. 2A, curves 24, 25, and 26 represent, on a time base, the electric potential across diode 13 for various levels of input wave energy. Curve 24 represents low level wave energy which lies completely within region I. The positive peaks of input wave 25 extend into regions II and those of input wave 26 extend into regions II and III.

If the input wave consists of noise energy alone, that is, if a particular time slot is unoccupied by a signal pulse but occupied by spurious noise only, the potential developed across diode 13 would be somewhat as shown by curve 24. The positive peaks of this voltage do not cause diode 13 to be driven into region II which is the region of impedance mismatch and consequently, no energy is reflected. Since all the energy is absorbed in diode 13 and none reflected, no energy is coupled into output waveguide section 14 by circulator 11.

If, however, the input wave is of higher level such as is the case when the time slot is occupied by a true signal pulse and substantially no noise energy, the potential developed across diode 13 is substantially as shown by curve 25. In this situation it is seen that the positive peaks of the voltage across diode 13 do drive it into region II, a region seen in FIG. 2B to be one of substantial mismatch. While diode 13 is in region II the energy incident upon it is totally reflected. Thus the peaks of curve 25 which lie in region II are reflected and in turn coupled out of waveguide section 12 and into output waveguide section 14 via circulator 11.

The limiting action of the invention is seen by considering an input wave which produces a voltage across the diode corresponding to curve 26. Such an input wave would typically be a signal pulse upon which is superimposed a great deal of spurious noise energy. This voltage not only extends into region II but also region III. While the diode is in region I, guide 12 is matched and no reflection takes place. However, when the diode is in region II energy is reflected in precisely the same manner as described above. The extreme positive peaks of curve 26 drive the diode into region III which, as seen in FIG. 2B, is a region wherein the diode impedance is again matched to guide 12. Therefore the only time during which energy is reflected is the time when diode 13 is in region II and this is the only time in which a pulse appears in output waveguide section 14.

It is clear from the above operational description that no reflected pulses, and consequently, no output power $P_o$ is obtained with low levels of input power. Raising the input power level results in a sudden increase in output power. Beyond a point, however, the output power $P_o$ will no longer increase with increasing input power, since the positive peaks of the electric potential across diode 13 will drive the diode into the upper linear region of the

*e-i* curve, causing the diode impedance to approximately match the impedance of waveguide section 12.

Figure 3:
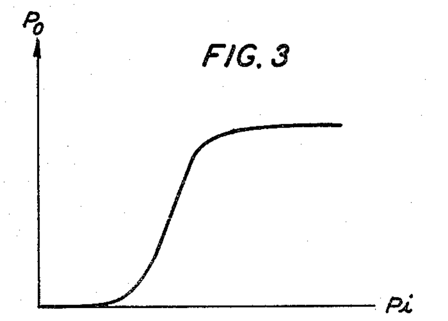
FIG. 3 is a graphic representation of the power output versus power input of the embodiment of FIG. 1.

FIG. 3 illustrates the resultant over-all power input versus power output curve of the embodiment of FIG. 1. This curve is recognizable as the typical input-output characteristic of a practical, as opposed to ideal, pulse regenerator.

For some applications it may be undesirable to use the embodiment of FIG. 1. For example, it may be inconvenient to construct or utilize 3-port circulator 11. If this is the case, an alternate embodiment such as the one of FIG. 4 can be utilized.

Figure 4:
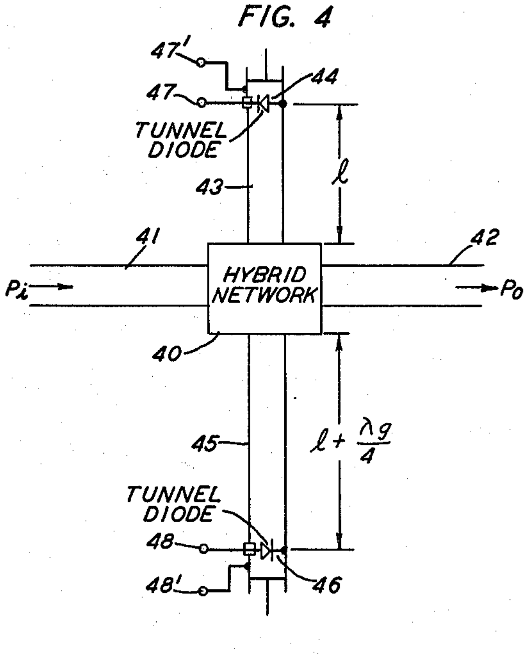
FIG. 4 is an alternate Esaki diode PCM regenerator in accordance with the present invention.

In FIG. 4 there is shown a hybrid network 40 having arms, or branches 41, 42, 43, and 45 to which appropriate circuit connections hereinbelow are made. Arms 41 and 42, and 43 and 45, respectively, constitute pairs of conjugate arms of the hybrid and are characterized by the fact that substantially no energy is transmitted directly from one arm of each pair to the other arm of that pair and that the connections to the respective arms of such conjugate pair may be interchanged without affecting the performance of the circuit. Thus, substantially no energy is transmitted directly from arm 41, which is the input arm of the device, to arm 42, which is the output arm of the device.

For operation at microwave frequencies the hybrid network may constitute the familiar waveguide hybrid junction commonly known as the "magic T." Of course, other hybrid networks having equivalent characteristics can also be employed. Again, it is a matter of choice as to which particular transmission lines and hybrid networks are to be utilized in practicing the invention.

Arms 43 and 45 are terminated by diodes 44 and 46, respectively and are, as in the previous embodiment, matched to their respective waveguide sections at zero or near zero input power. The diodes, which exhibit the electrical characteristics mentioned in connection with the previous embodiment, are also oriented so that an electric potential appears across their electrodes in the presence of an input wave. External connections 47 and 47' and 48 and 48' are made in the same manner as in the embodiment of FIG. 1 and their function will be discussed hereinbelow.

In operation, wave energy of power $P_i$ is introduced to input waveguide section 41. This wave, comprising a pulse code modulated signal with superimposed noise energy, is transmitted to the hybrid network 40 and is equally divided therein between arms 43 and 45. The amount of energy reflected in each arm 43 and 45 is, as in the case of the embodiment of FIG. 1, dependent upon the energy level of the input wave. Low level input wave energy is absorbed in diodes 44 and 46 and no reflection occurs; whereas input waves having levels high enough to drive the diodes into region II of FIG. 2A are partially reflected. Arm 45 is proportioned so that it has an electrical length that is longer than arm 43 by an odd multiple of a quarter wavelength. The pulses reflected at diodes 44 and 46 thereby reach junction 40 180 degrees out of phase and are coupled to the output arm 42. The over-all power input versus power output curve of the embodiment of FIG. 4 is similar to that of the embodiment of FIG. 1 and depicted in FIG. 3.

Figures 5, 6:
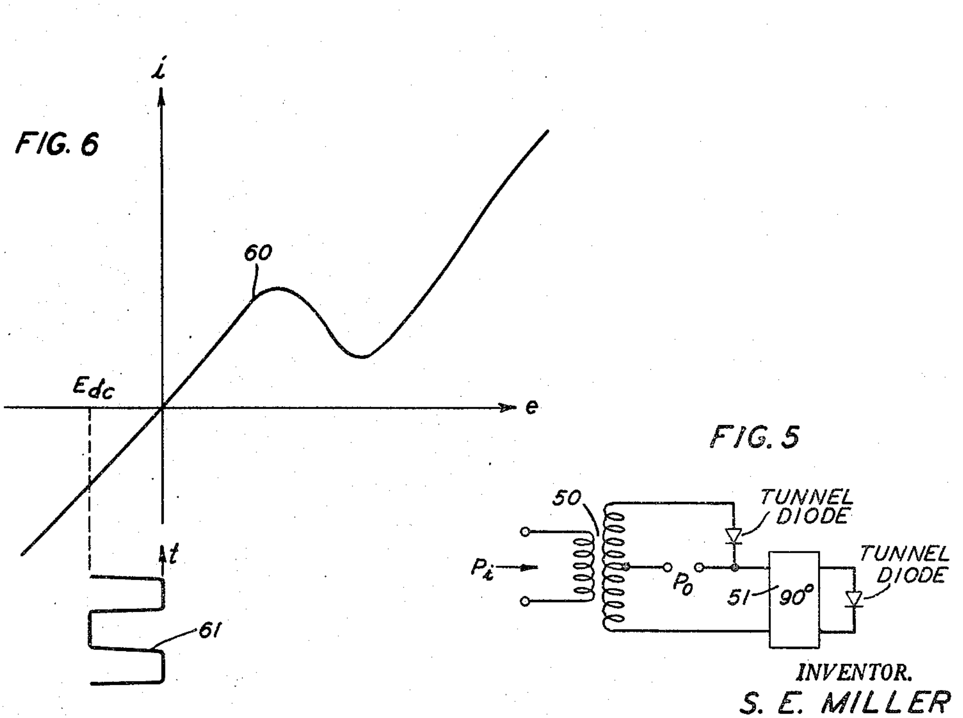
FIG. 5 is a schematic diagram of a baseband PCM regenerator in accordance with the present invention.
FIG. 6 is a graphic representation illustrating the means by which direct-current biasing and retiming pulses may be utilized in the embodiments of FIG. 1 and FIG. 4.

FIG. 5 is a schematic representation of yet another embodiment of the present invention. This embodiment utilizes lumped parameter elements and is designed for operation at lower (baseband) frequencies. The operation of this device is substantially the same as that of the device of FIG. 4. In the embodiment of FIG. 5, a hybrid transformer 50 has replaced the hybrid junction 40 of FIG. 4. In a like manner, a ninety degree bilateral phase shift network 51 has replaced the extra quarter-wave section in arm 45.

In the embodiments of FIGS. 1 and 4, it was assumed that the diodes were not connected to any biasing or timing pulse source. If simple pulse regeneration is all that is desired, no biasing is necessary. If, on the other hand, one wishes to retime the regenerated pulses, a slight modification in the circuitry is made.

To illustrate this feature, assume that a bias of voltage $E_{dc}$ is applied to the diodes utilized in the embodiments of either FIG. 1 or FIG. 4 so that the diode or diodes are biased in the reverse direction. Now, in order for pulse regeneration to occur in the manner previously described, the input wave energy must be much higher. It must be high enough to produce a voltage across each diode which traverses the region between $E_{dc}$ and zero as well as the region between zero and the beginning of the negative resistance region.

In most practical cases, however, it is not the magnitude of the input wave energy that is subject to adjustment. If the input wave energy is relatively constant, then $E_{dc}$ can be varied so as to allow pulse regeneration to occur. If $E_{dc}$ is varied at the pulse repetition frequency then retiming is accomplished.

FIG. 6 is a graphic illustration of this process. The *e-i* curve of the diode is shown by curve 60. The plot of the retiming pulses as a function of time is shown by curve 61. It is readily seen that if the PCM signal arrives at the diode when the bias voltage equal $E_{dc}$ then no regeneration occurs, since the voltage produced across the diode does not traverse the negative resistance region. If, on the other hand, the PCM signal is coincident in time with the retiming pulses of curve 61, then regeneration occurs precisely as described above.

A bias and retiming pulse source 16 is shown in FIG. 1. This source is connected directly to terminals 15 and 15'. A similar source can be utilized in the embodiment of FIG. 4 by connecting it across the terminals 47 and 47' and 48 and 48', in which case a single source can be used if the correct polarity is observed.

Although certain specific embodiments of the invention have been shown in the drawings and described in the foregoing specification, it is understood that the invention is not limited to these specific embodiments but is capable of modification and rearrangement without departing from the spirit and scope of the invention.

What is claimed is:

1. A microwave pulse regenerator comprising, in combination, a source of pulsed high frequency electromagnetic wave energy, at least one high frequency transmission line having a given characteristic impedance, means for coupling said wave energy to one end of said line, means for reflecting the energy above a first energy level and below a second energy level from the other end of said line, said reflecting means comprising a nonlinear impedance element coupled to said line and matched to said characteristic impedance below said first energy level and above said second energy level and mismatched to said characteristic impedance between said first and second energy levels, and means for extracting said reflected energy from said line.

2. The combination according to claim 1 wherein said nonlinear impedance element is an Esaki diode.

3. A pulse regenerator comprising, in combination, a hybrid junction having at least two pairs of conjugate arms extending therefrom, input and output connections for the respective arms of the first of said pairs, a source of high frequency electromagnetic wave energy coupled to said input connection, nonlinear impedance elements of substantially identical electrical characteristics coupled to each arm of the second of said pairs so as to interact with the energy therein and having impedances matched to the characteristic impedance of said arms of said second pair at low and high energy levels and mismatched to said characteristic impedance at intermediate energy levels between said high and low levels.

4. The combination according to claim 3 wherein said nonlinear impedance elements are Esaki diodes.

5. The combination according to claim 3 wherein said hybrid junction is a "magic T," said arms are hollow conductively bounded waveguide sections and wherein one of the arms of said second pair has an effective electrical length an odd multiple of one-quarter wavelength longer than the other arm of said pair.

6. The combination according to claim 3 wherein said hybrid junction is a hybrid transformer and wherein the coupling means for one of said nonlinear elements includes a ninety degree phase shift network.

7. A pulse regenerator comprising, in combination, a source of pulsed high frequency electromagnetic wave energy of variable amplitude, means for applying said energy to a high frequency transmission line, means for terminating said line with a nonlinear impedance element, said element being responsive to the amplitude of said energy so that substantially all of said energy below a first amplitude and above a second amplitude is absorbed by said element while energy having amplitudes between said first and second amplitudes is reflected by said element and means for extracting said reflected energy from said line.

8. The combination according to claim 7 wherein said nonlinear impedance element is an Esaki diode.

9. In combination, a microwave circulator, a first, second, and third waveguide section of a given characteristic impedance coupled to a first, second, and third port of said circulator respectively, means for applying pulsed microwave energy to said first waveguide section, a nonlinear impedance element mounted in said second waveguide section, said element being matched to said characteristic impedance for low and high levels of said energy and mismatched to said characteristic impedance for intermediate levels of said energy between said high and low levels, means for applying a variable biasing voltage to said element, and utilization means coupled to said third waveguide section.

10. The combination according to claim 9 wherein said nonlinear impedance element is an Esaki diode.

11. A microwave pulse regenerator comprising a waveguide junction having at least two pairs of conjugate arms extending therefrom, input and output connections for the respective arms of one of said pairs, nonlinear impedance elements of substantially identical electrical characteristics mounted in each arm of another of said pairs, said elements having a dynamic impedance matched to the impedance of said arms for high and low pulse amplitude ranges but mismatched for pulses in an intermediate amplitude range and means for applying a variable biasing voltage to said elements.

12. The combination according to claim 11 wherein said nonlinear impedance elements are Esaki diodes.

13. A pulse regenerator comprising means forming an extended signal wave transmission path, means connected along said path for absorbing signal wave energy above and below an intermediate range of levels and for passing signal waves of said intermediate range of levels, comprising means having a dynamic impedance characteristic which includes regions corresponding to levels above and below said intermediate range where the dynamic impedance substantially matches the characteristic impedance of said path and a region corresponding to said intermediate range where the dynamic impedance is significantly different from the characteristic impedance of said path.

References Cited by the Examiner

UNITED STATES PATENTS

| | | | |
|---|---|---|---|
| 2,914,249 | 11/59 | Goodall | 333—11 |
| 2,994,828 | 8/61 | Ruthroff | 333—11 |

HERMAN KARL SAALBACH, *Primary Examiner.*